United States Patent
Liu et al.

(10) Patent No.: US 8,183,981 B2
(45) Date of Patent: May 22, 2012

(54) PASSIVE TAG WITH OSCILLATOR CIRCUIT AND FREQUENCY IDENTIFICATION SYSTEM UTILIZING THE SAME

(75) Inventors: Hsin-Chin Liu, Taipei (TW); Jhih-Guo Peng, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 704 days.

(21) Appl. No.: 12/370,580

(22) Filed: Feb. 12, 2009

(65) Prior Publication Data

US 2010/0102925 A1    Apr. 29, 2010

(30) Foreign Application Priority Data

Oct. 27, 2008   (TW) ................................ 97141143 A

(51) Int. Cl.
    *G08B 21/00*    (2006.01)
(52) U.S. Cl. ...................... 340/10.1; 340/10.3; 340/10.4; 340/10.41; 340/572.1; 342/127; 342/458; 455/70; 455/71; 455/456.1; 455/556.1; 330/260; 330/303

(58) Field of Classification Search .................. 342/127, 342/458; 455/70, 71, 456.1, 556.1; 330/260, 330/303

See application file for complete search history.

(56) References Cited

U.S. PATENT DOCUMENTS

| | | | | |
|---|---|---|---|---|
| 2002/0158752 | A1* | 10/2002 | Steele et al. | 340/10.4 |
| 2004/0203478 | A1* | 10/2004 | Scott | 455/70 |
| 2005/0156709 | A1* | 7/2005 | Gilbert et al. | 340/10.1 |
| 2006/0267772 | A1* | 11/2006 | Knadle et al. | 340/572.4 |
| 2009/0102120 | A1* | 4/2009 | Hou et al. | 273/153 R |

\* cited by examiner

*Primary Examiner* — Jennifer Mehmood
*Assistant Examiner* — Mark Rushing
(74) *Attorney, Agent, or Firm* — Wang Law Firm, Inc.; Li K. Wang

(57) ABSTRACT

A passive tag receiving a reader signal provided by a reader is disclosed. The passive tag includes an antenna, an oscillator circuit, and an internal chip. The antenna receives the reader signal. The reader signal is within an operation frequency band. The oscillator circuit is coupled to the antenna and generates a frequency signal. The internal chip processes the reader signal according to power provided by the reader signal and the frequency signal when the reader signal is received and the frequency signal is generated.

16 Claims, 2 Drawing Sheets

PASSIVE TAG WITH OSCILLATOR CIRCUIT AND FREQUENCY IDENTIFICATION SYSTEM UTILIZING THE SAME

CROSS REFERENCE TO RELATED APPLICATIONS

This Application claims priority of Taiwan Patent Application No. 097141143, filed on Oct. 27, 2008, the entirety of which is incorporated by reference herein.

BACKGROUND OF THE INVENTION

1. Field of the Invention

The invention relates to a radio frequency identification (RFID) system, and more particularly to a radio frequency identification system comprising a passive tag.

2. Description of the Related Art

Radio frequency identification (RFID) utilizes a wireless method to transmit data and to obtain the related information of a tag. The tag is disposed in an object, for identification. When the object enters the read range of a reader, the tag issues some information, such as identification (ID). The reader receives and decodes the information. The decoded result provided by the reader is transmitted to a behind computer. After the behind computer processes the decoded information, the identifying procedure is finished.

For a passive tag, the reader provides the required power to the passive tag. However, the power provided by the reader is dependent upon the distance between the reader and the passive tag. For example, when the distance between the reader and the passive tag is longer, the power received by the passive tag is reduced. When the power received by the passive tag is insufficient, the passive tag cannot transmit information to the reader.

BRIEF SUMMARY OF THE INVENTION

Passive tags are provided. An exemplary embodiment of a passive tag, which receives a reader signal provided by a reader, comprises an antenna, an oscillator circuit, and an internal chip. The antenna receives the reader signal. The reader signal is within an operation frequency band. The oscillator circuit is coupled to the antenna and generates a frequency signal. The internal chip processes the reader signal according to power provided by the reader signal and the frequency signal when the reader signal is received and the frequency signal is generated.

RFID systems are also provided. An exemplary embodiment of an RFID system comprises a reader and a passive tag. The reader provides a reader signal. The passive tag comprises an antenna, an oscillator circuit, and an internal chip. The antenna receives the reader signal. The reader signal is within an operation frequency band. The oscillator circuit is coupled to the antenna and generates a frequency signal. The internal chip processes the reader signal according to power provided by the reader signal and the frequency signal when the reader signal is received and the frequency signal is generated.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
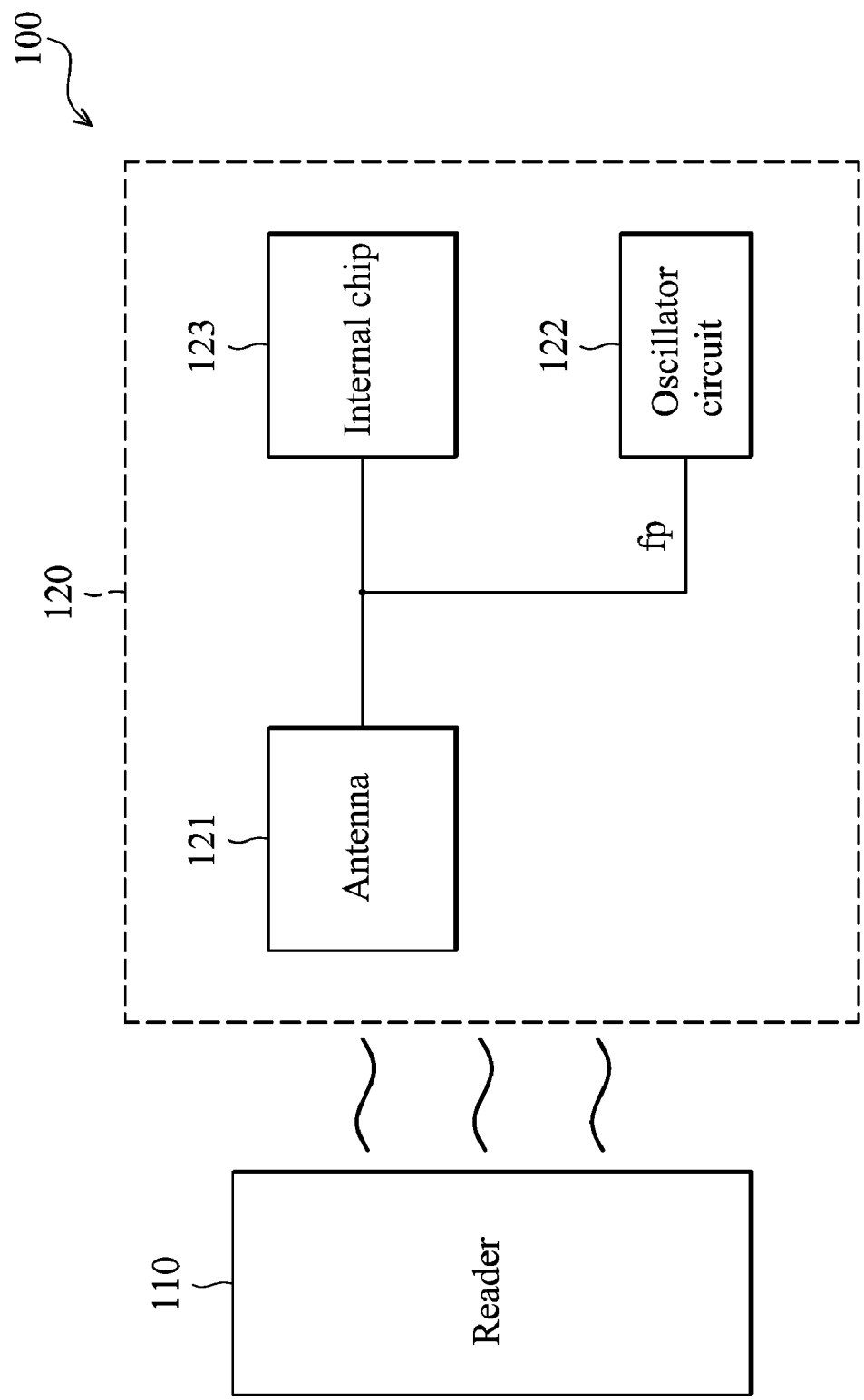
FIG. 1 is a schematic diagram of an exemplary embodiment of an RFID system.

FIG. 1 is a schematic diagram of an exemplary embodiment of an RFID system. The RFID system 100 comprises a reader 110 and a passive tag 120. The reader 110 utilizes a wireless method to communicate with the passive tag 120. For example, the reader 110 issues a reader signal to the passive tag 120. The passive tag 120 issues an corresponding signal to the reader 110 according to the reader signal. The reader 110 obtains the related information according to the corresponding signal.

As shown in FIG. 1, the passive tag 120 comprises an antenna 121, an oscillator circuit 122, and an internal chip 123. The antenna 121 receives the reader signal from and provides an corresponding signal to the reader 110. The reader signal provided by the reader 110 is within an operation frequency band. In one embodiment, the operation frequency band is 860 MHz to 960 MHz.

The oscillator circuit 122 is coupled to the antenna 121 and generates a frequency signal fp. In one embodiment, the frequency signal fp is outside of the operation frequency band. For example, the frequency signal fp may be less than or equal to 800 MHz or exceed or be equal to 1 GHz. In some embodiments, the frequency signal fp is within the operation frequency band.

The internal chip 123 processes the reader signal according to power provided by the reader signal and the frequency signal fp when the reader signal is received by the antenna 121 and the frequency signal fp is generated by the oscillator circuit 122. The internal chip 123 not only receives the power provided by the reader 110, but also receives the power provided by the oscillator circuit 122. Thus, the distance between the reader 110 and the passive tag 120 can be increased. Additionally, when the oscillator circuit 122 stops generating the frequency signal fp, the internal chip 123 does not stop working. In this embodiment, the internal chip 123 only bases on the power provided by the reader signal to process the reader signal when the oscillator circuit 122 stops generating the frequency signal fp.

Figure 2:
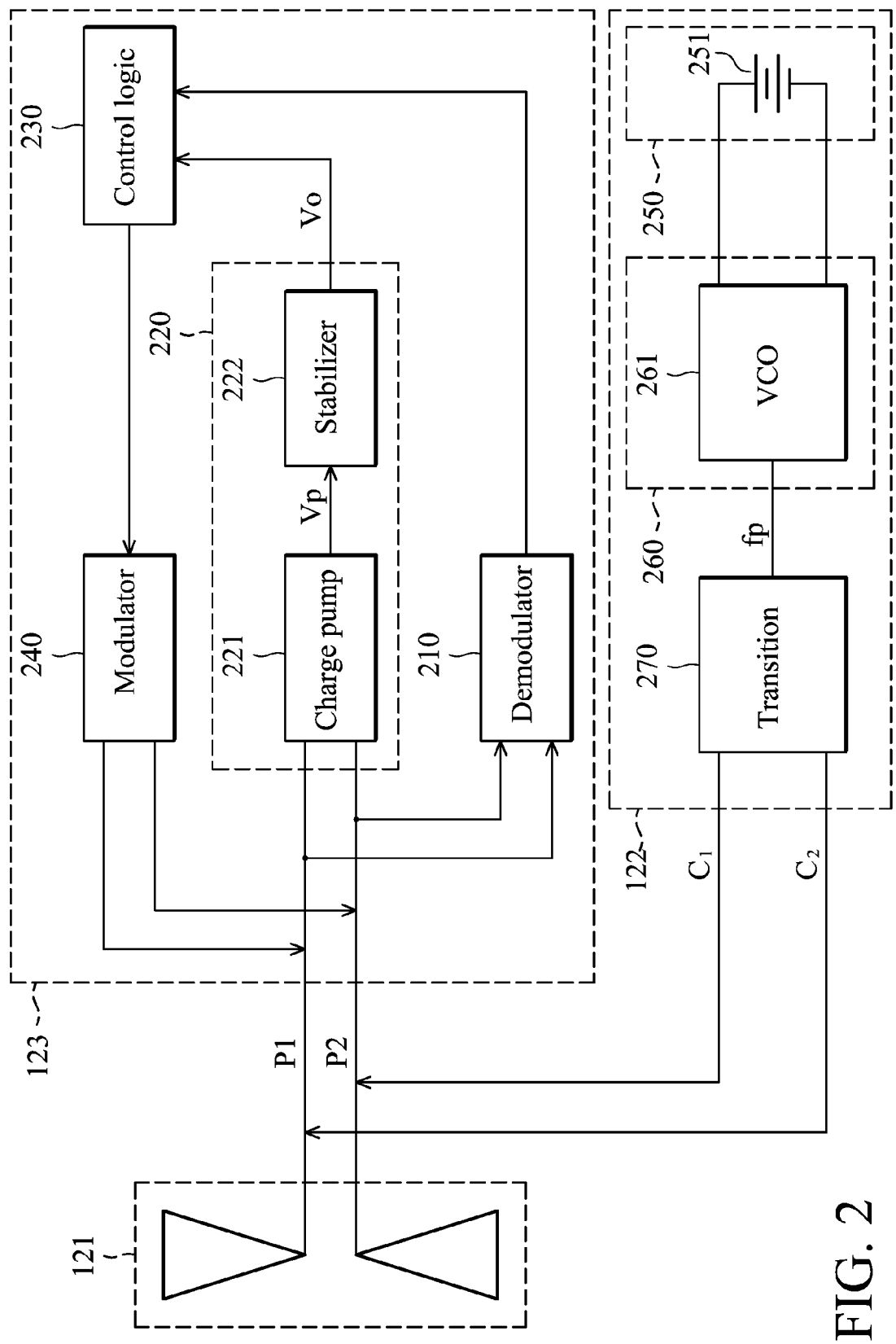
FIG. 2 is a schematic diagram of an exemplary embodiment of the passive tag.

FIG. 2 is a schematic diagram of an exemplary embodiment of the passive tag. The internal chip 123 utilizes the connection ports P1 and P2 to receive signals or transmit signals. In this embodiment, the oscillator circuit 122 utilizes the connection ports P1 and P2 to provide the frequency signal fp to the internal chip 123. In some embodiment, the oscillator circuit 122 only utilizes the connection port P1 or P2 to provide the frequency signal fp to the internal chip 123. Furthermore, the oscillator circuit 122 shown in FIG. 2 is an exemplary embodiment, but the disclosure is not limited thereto. The oscillator circuit 122 can be replaced by any oscillator circuit.

As shown in FIG. 2, the oscillator circuit 122 is connected to the antenna 121 in parallel. The oscillator circuit 122 comprises a power supply 250, an oscillator 260, and a transition 270. The power supply 250 provides a power level to the oscillator 260. In this embodiment, the power supply 250 is a battery 251. The oscillator 260 receives the power level provided by the power supply 250 and generates the frequency signal fp. In this embodiment, the oscillator 260 is a voltage control oscillator (VCO) 261. The power level provided by the battery 251 is an operation voltage of the VCO 261.

The transition 270 transforms the frequency signal fp to generate transforming signals $C_1$ and $C_2$. Since the internal chip 123 utilizes the connection ports P1 and P2 to receive signal, the transition 270 is utilized to generate the transforming signals $C_1$ and $C_2$. In this embodiment, the phase difference between the transforming signals $C_1$ and $C_2$ is 180°. In some embodiments, the transition 270 can be omitted. Additionally, if the internal chip 123 only utilizes the connection port P1 or P2 to receive signals, the frequency signal fp generated by the oscillator 260 is directly transmitted to the internal chip 123.

The internal chip 123 is connected to the antenna 121 and comprises a demodulator 210, a power harvester 220, a control logic 230, and a modulator 240. The demodulator 210 demodulates the reader signal received by the antenna 121 and transmits the demodulated result to the control logic 230.

The power harvester 220 generates an operation voltage Vo according to the power provided by the reader signal and the frequency signal fp when the reader signal is received and the frequency signal fp is generated. When the oscillator circuit 122 stops generating the frequency signal fp (such as the battery 251 cannot provide enough power), the power harvester 220 can only base on the power provided by the reader signal to generate the operation voltage Vo. In this embodiment, the power harvester 220 comprises a charge pump 221 and a stabilizer 222, but is not limited thereto.

The charge pump 221 generates a pump voltage Vp according to the power provided by the reader signal and the frequency signal fp. In one embodiment, when the oscillator circuit 122 stops generating the frequency signal fp, the charge pump 221 can only base the power provided by the reader signal to generate the pump voltage Vp. In this embodiment, the charge pump 221 rectifies and boosts the power to generate the pump voltage Vp. The stabilizer 222 processes the pump voltage Vp to generate the operation voltage Vo.

The control logic 230 receives the operation voltage Vo and generates an corresponding signal according to the demodulated result. The modulator 240 modulates the corresponding signal generated by the control logic 230 and transmits the modulated result to the reader 110 via the antenna 121.

The internal chip 123 not only obtains the power provided by the reader signal, but also obtains the power provided by the frequency signal fp generated by the oscillator circuit 122. Thus, the distance between the reader 110 and the passive tag can be increased. Furthermore, when the structure of the internal chip 123 is not changed, if the oscillator circuit 122 is connected to the connection ports P1 or/and P2 of the internal chip 123, the power harvester 220 of the internal chip 123 generates the operation voltage Vo according to the power provided by the reader signal and the frequency signal fp.

Additionally, the oscillator circuit 122 is connected to the antenna 121 in parallel. When the battery 251 of the oscillator circuit 122 can not provide enough power to the internal chip 123, the internal chip 123 can only base on the power provided by the reader signal to process the reader signal provided by the reader 110.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A passive tag receiving a reader signal provided by a reader, comprising:
   an antenna receiving the reader signal within an operation frequency band;
   an oscillator circuit coupled to the antenna and generating a frequency signal; and
   an internal chip processing the reader signal, wherein the internal chip processes the reader signal according to power provided by the reader signal and the frequency signal when the reader signal is received and the frequency signal is generated,
   wherein the oscillator circuit comprises:
   a power supply providing a power level;
   an oscillator receiving the power level and generating the frequency signal; and
   a transition transforming the frequency signal to generate a first transforming signal and a second transforming signal, wherein the phase difference between the first and the second transforming signals is 180°.

2. The passive tag as claimed in claim 1, wherein when the oscillator circuit stops generating the frequency signal, the internal chip only bases on the power provided by the reader signal to process the reader signal.

3. The passive tag as claimed in claim 1, wherein the internal chip comprises:
   a demodulator demodulating the reader signal;
   a power harvester generating an operation voltage according to the power provided by the reader signal and the frequency signal when the reader signal is received and the frequency signal is generated;
   a control logic receiving the operation voltage and generating a corresponding signal according to the demodulated result; and
   a modulator modulating the corresponding signal and transmitting the modulated result to the reader via the antenna.

4. The passive tag as claimed in claim 3, wherein when the oscillator circuit stops generating the frequency signal, the power harvester only bases on the power provided by the reader signal to generate the operation voltage.

5. The passive tag as claimed in claim 3, wherein the power harvester comprises:
   a charge pump generating a pump voltage according to the power provided by the reader signal and the frequency signal; and
   a stabilizer processing the pump voltage to generate the operation voltage.

6. The passive tag as claimed in claim 1, wherein the frequency signal is outside of the operation frequency band.

7. The passive tag as claimed in claim 1, wherein the internal chip is connected to the antenna in parallel and the oscillator circuit is connected to the antenna in parallel.

8. The passive tag as claimed in claim 1, wherein the power supply is a battery.

9. A radio frequency identification (RFID) system, comprising:
   a reader providing a reader signal; and
   a passive tag comprising:
   an antenna receiving the reader signal within an operation frequency band;
   an oscillator circuit coupled to the antenna and generating a frequency signal; and an internal chip processing the reader signal, wherein the internal chip processes the reader signal according to power provided by the reader signal and the frequency signal when the reader signal is received and the frequency signal is generated, wherein the oscillator circuit comprises:
a power supply providing a power level;
an oscillator receiving the power level and generating the frequency signal; and
a transition transforming the frequency signal to generate a first transforming signal and a second transforming signal, and the phase difference between the first and the second transforming signals is 180°.

10. The RFID system as claimed in claim 9, wherein when the oscillator circuit stops generating the frequency signal, the internal chip only bases on the power provided by the reader signal to process the reader signal.

11. The RFID system as claimed in claim 9, wherein the internal chip comprises:
a demodulator demodulating the reader signal;
a power harvester generating an operation voltage according to the power provided by the reader signal and the frequency signal when the reader signal is received and the frequency signal is generated;
a control logic receiving the operation voltage and generating a corresponding signal according to the demodulated result; and
a modulator modulating the corresponding signal and transmitting the modulated result to the reader via the antenna.

12. The RFID system as claimed in claim 11, wherein when the oscillator circuit stops generating the frequency signal, the power harvester can only base on the power provided by the reader signal to generate the operation voltage.

13. The RFID system as claimed in claim 11, wherein the power harvester comprises:
a charge pump generating a pump voltage according to the power provided by the reader signal and the frequency signal; and
a stabilizer processing the pump voltage to generate the operation voltage.

14. The RFID system as claimed in claim 9, wherein the frequency signal is outside of the operation frequency band.

15. The RFID system as claimed in claim 9, wherein the internal chip is connected to the antenna in parallel and the oscillator circuit is connected to the antenna in parallel.

16. The RFID system as claimed in claim 9, wherein the power supply is a battery.

* * * * *